United States Patent [19]

Campbell

[11] Patent Number: 5,238,093

[45] Date of Patent: Aug. 24, 1993

[54] WEAR INDICATOR FOR ADJUSTABLE CLUTCH

[75] Inventor: Steve C. Campbell, Alsip, Ill.

[73] Assignee: Dana Corporation, Toledo, Ohio

[21] Appl. No.: 935,776

[22] Filed: Aug. 28, 1992

[51] Int. Cl.⁵ ............................................. F16D 22/00
[52] U.S. Cl. .............................. 192/30 W; 192/111 B; 188/1.11
[58] Field of Search .................. 192/30 W, 111 B; 116/321, 323, 324; 188/1.11

[56] References Cited

U.S. PATENT DOCUMENTS

| | | | |
|---|---|---|---|
| 1,258,115 | 3/1918 | Henderson | 192/30 W |
| 2,036,005 | 5/1933 | Wemp | 192/70.17 |
| 2,057,876 | 10/1936 | Berry | 192/30 W |
| 2,070,813 | 2/1937 | Stearns et al. | 192/111 B X |
| 2,462,944 | 3/1949 | Cardwell et al. | 192/111 B |
| 2,661,826 | 12/1953 | Hendrickson et al. | 192/111 B X |
| 2,758,691 | 8/1956 | Palm | 192/111 B |
| 2,842,241 | 7/1958 | Palm | 192/111 B X |
| 2,863,537 | 12/1958 | Root | 192/111 B X |
| 2,897,935 | 8/1959 | Croft | 192/111 B X |
| 3,018,852 | 1/1962 | Stanton | 188/72.1 |
| 3,406,800 | 10/1968 | Buchanan et al. | 192/30 W |
| 3,701,401 | 10/1972 | Palma et al. | 192/30 W X |
| 4,186,822 | 2/1980 | Khuntia et al. | 188/1.11 |
| 4,452,349 | 6/1984 | Tscheplak | 192/30 W |
| 4,625,843 | 12/1986 | Maltby et al. | 192/30 W X |
| 4,658,936 | 4/1987 | Moseley | 188/1.11 |
| 4,832,164 | 5/1989 | Flotow | 192/111 B |

FOREIGN PATENT DOCUMENTS

| | | | |
|---|---|---|---|
| 594366 | 2/1978 | U.S.S.R. | 192/111 B |
| 2110334 | 6/1983 | United Kingdom . | |

*Primary Examiner*—Leslie A. Braun
*Assistant Examiner*—Andrea Pitts
*Attorney, Agent, or Firm*—Millen, White, Zelano, & Branigan

[57] ABSTRACT

The position of an adjusting ring used in a clutch adjustable for wear is monitored by an indicator comprised of a pin having a first end biased into engagement with the adjusting ring and a second end which is visible from outside of the clutch housing. As the adjusting ring is turned to compensate for clutch wear, the adjusting ring moves axially with respect to the clutch housing and the pin moves progressively into the clutch housing. When the end of the pin is no longer projecting from the housing, the mechanic knows that clutch wear can no longer be compensated for by axially advancing the adjusting ring. In accordance with a preferred embodiment, the indicator pin is made of nylon and is retained in a nylon sleeve while being biased by a coil spring. The assembly is initially held together by abutment between a rib projecting from the pin and an end surface of the sleeve.

11 Claims, 4 Drawing Sheets

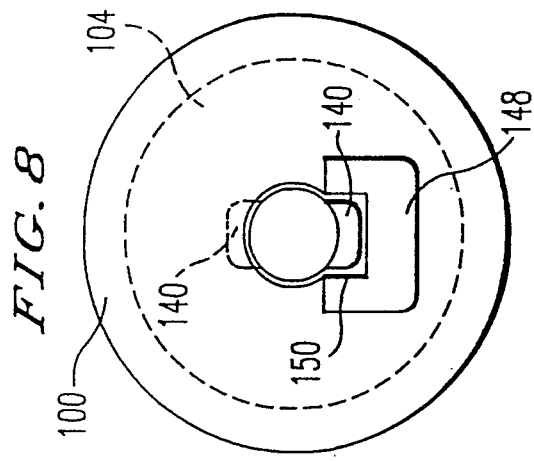
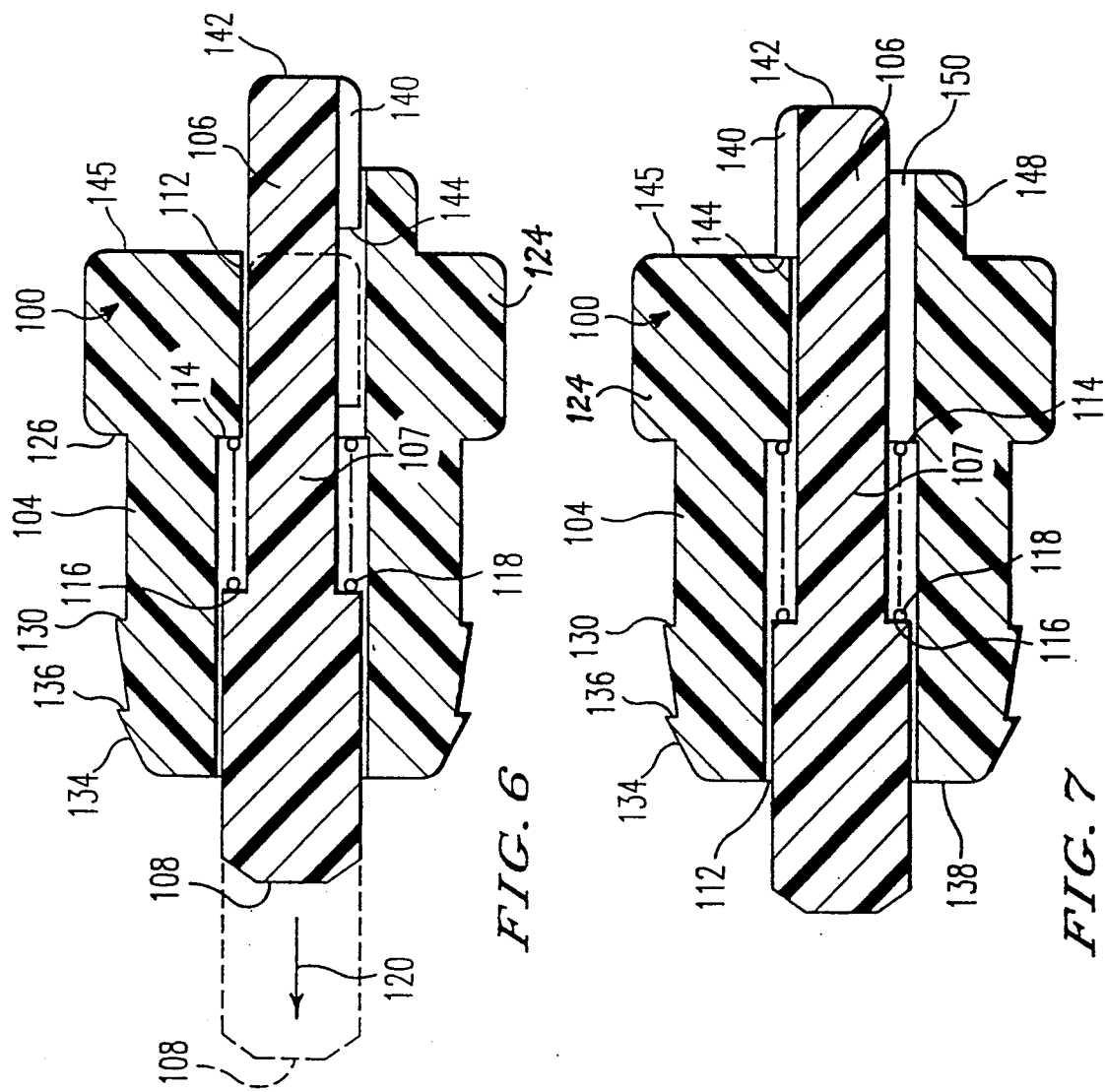

WEAR INDICATOR FOR ADJUSTABLE CLUTCH

BACKGROUND OF THE INVENTION

1. Field of the Invention

The instant invention relates to wear indicators for clutches. More particularly, the instant invention relates to wear indicators for monitoring the position of an adjusting ring in an adjustable clutch.

2. Background Art

In order to transmit drive from an engine-driven flywheel to an output shaft, many clutches utilize levers for selectively urging driving and driven discs into contact with one another. The levers have first ends pivoted on a release sleeve and second ends pivoted on a clutch cover which rotates with the flywheel. Intermediate the ends of each lever are abutment surfaces, which urge a pressure plate against the discs to effect frictional coupling of the discs. As the discs wear, the clutch will begin to slip if the position of the levers is not adjusted to compensate for the wear.

The adjustment is accomplished by an adjusting ring having an external thread which is threadably coupled to an internal thread of the clutch cover. By rotating the adjusting ring so as to axially advance with respect to the clutch cover and the drive train, the second ends of the levers may be advanced so as to maintain proper pressure between the abutting surfaces of the levers and the pressure plate.

Since the adjusting ring is positioned within the clutch cover, it is difficult to determine the amount of wear by external inspection of the clutch. Currently, with clutches utilizing adjusting rings, it is necessary to rely on scales and other measuring devices to accurately determine the position of the adjusting ring. This requires one to remove the clutch assembly from the vehicle, a time-consuming and somewhat expensive undertaking.

While the patent literature has recognized the advantages of monitoring clutch wear by observing an external indicator, such as a biased, sliding pin, a satisfactory approach for monitoring the position of an adjusting ring has not been addressed. When a clutch is equipped with an adjusting ring, the position of the adjusting ring indicates previous wear rather than current wear. The mechanic is thus presented with a choice between replacing the clutch (or, perhaps, the clutch components) or of simply modifying the position of the adjusting ring. If the adjusting ring has previously been adjusted to its fullest extent, the mechanic cannot perform adjustments on the adjusting ring so as to revive operation of the clutch. With the adjustable clutches currently in use, it is not readily apparent that a clutch needs to be pulled rather than adjusted by simply looking at the clutch housing.

In addition to having no indication of the adjusting ring, the clutches currently available with adjusting rings have no external indicator of how much an adjusting ring is being advanced by an adjustment. In other words, when the adjusting pinion which drives the adjusting ring is rotated, there is no indication of how much the adjusting ring moves axially as the pinion is turned. Of course, one can calculate how far the adjusting ring has moved axially by counting the number of rotations of the pinion, but this requires the mechanic to acquire and apply abstract knowledge and skill which, even if mastered still poses considerable risk of error since, once the adjusting pinion is rotated to advance the adjusting ring and then rotated to retract the adjusting ring, the mechanic can easily lose track of its actual position.

SUMMARY OF THE INVENTION

It is an object of the instant invention to provide a new and improved wear indicator for monitoring the position of an adjusting ring which is used to adjust for wear in a clutch.

In its most general sense, the invention contemplates a device for indicating the position of one component with respect to another. The device comprises a sleeve having a bore therethrough with an axially facing shoulder therein, the sleeve having first and second ends with positioning abutments thereon. A pin is receivable in the bore, the pin having a first end for bearing against one of the components and a second end which is visible outside of the second component. The pin has a shoulder thereon facing the shoulder in the bore, and biasing means is disposed between the shoulder on the pin and the shoulder in the bore to urge the pin to project from the first end of the sleeve. The pin is releasably held against the bias of the spring until the device has been mounted on one of the components with the pin abutting the other component.

In a specific combination, the invention contemplates an adjusting ring position indicator in combination with a clutch having a clutch housing with internal threads in which is threadably mounted an adjusting ring, which adjusting ring advances axially to accommodate for wear in the clutch and which adjusting ring has a rear surface facing an inner surface of the clutch housing. The adjusting ring position indicator comprises a sleeve inserted through the clutch housing in alignment with the rear surface of the adjusting ring, with the sleeve having a bore therethrough and means for retaining the clutch housing. A pin is slidably received within the sleeve. The pin has a first end for abutment with the rear surface of the adjusting ring and a second end visible from outside of the clutch housing. When the first surface of the pin is in engagement with the rear surface of the adjusting ring, the exposed end of the pin provides a visual indication of the position of the adjusting ring with respect to the clutch housing and thus the amount of wear undergone by the clutch.

BRIEF DESCRIPTION OF THE DRAWINGS

Various other objects, features, and attendant advantages of the present invention will be more fully appreciated as the same becomes better understood when considered in conjunction with the accompanying drawings in which like reference characters designate the same or similar parts throughout the several views and wherein:

FIG. 6 is an enlarged side elevation of an adjusting ring position indicator in accordance with the principles of the instant invention configured in a use mode;

FIG. 7 is an elevational view of the adjusting ring position indicator of FIG. 5 configured in an assembly mode; and FIG. 8 is a front view of the adjusting ring indicator shown in FIGS. 6 and 7.

DESCRIPTION OF THE PREFERRED EMBODIMENTS

1. General Configuration of the Clutch Assembly (FIGS. 1-3)

Figure 3:
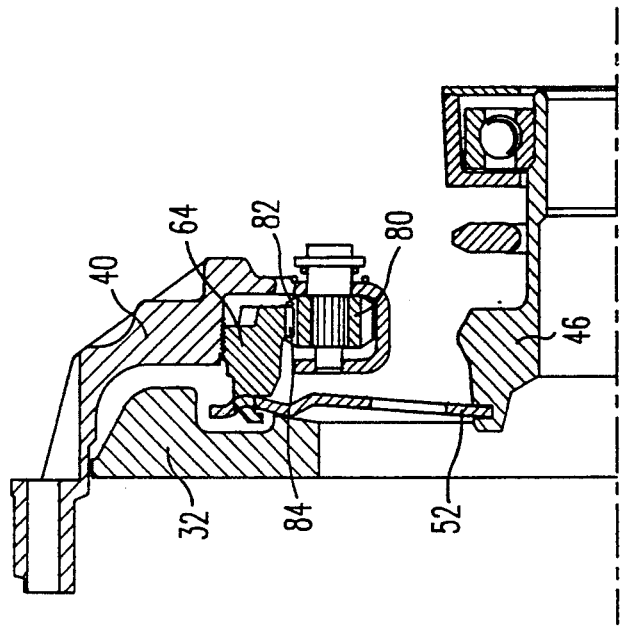
FIG. 3 is a side elevation showing a gearing arrangement for axially moving the adjusting ring.
Figure 1:
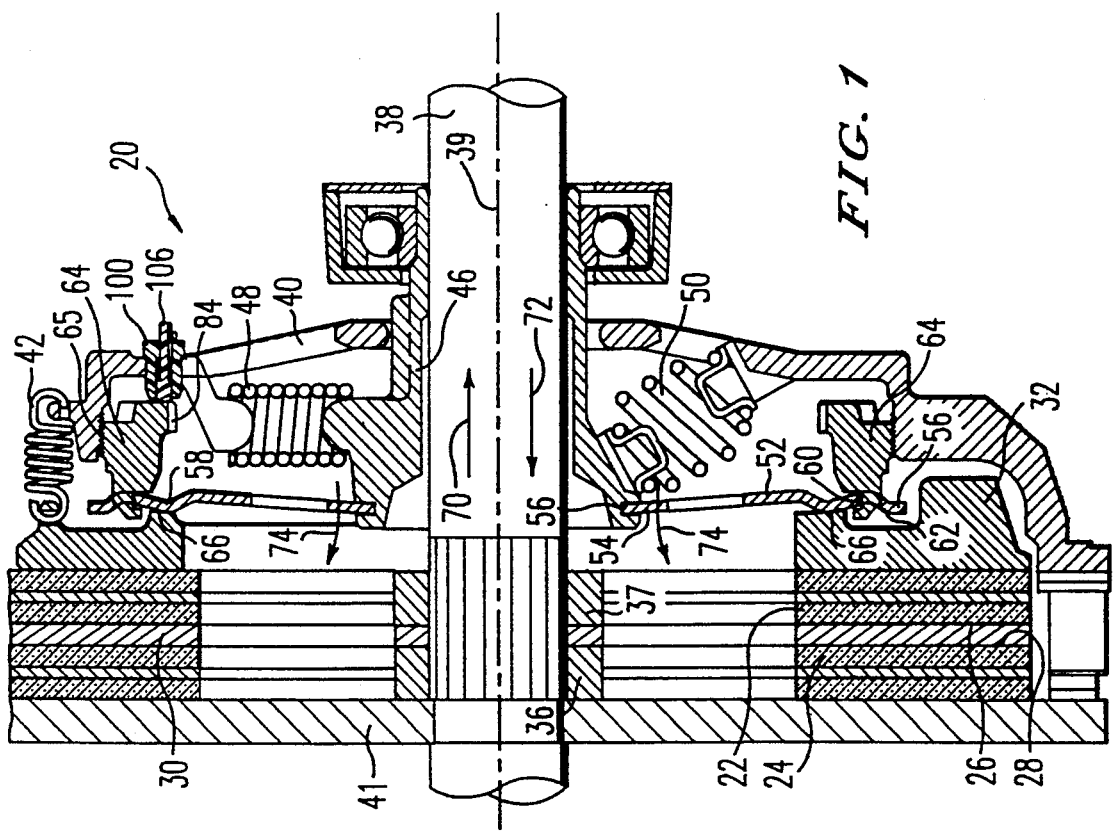
FIG. 1 a side elevation of a clutch assembly taken along lines 1—1 of FIG. 2, including an indicator for displaying the position of an adjusting ring within the clutch assembly.
Figure 2:
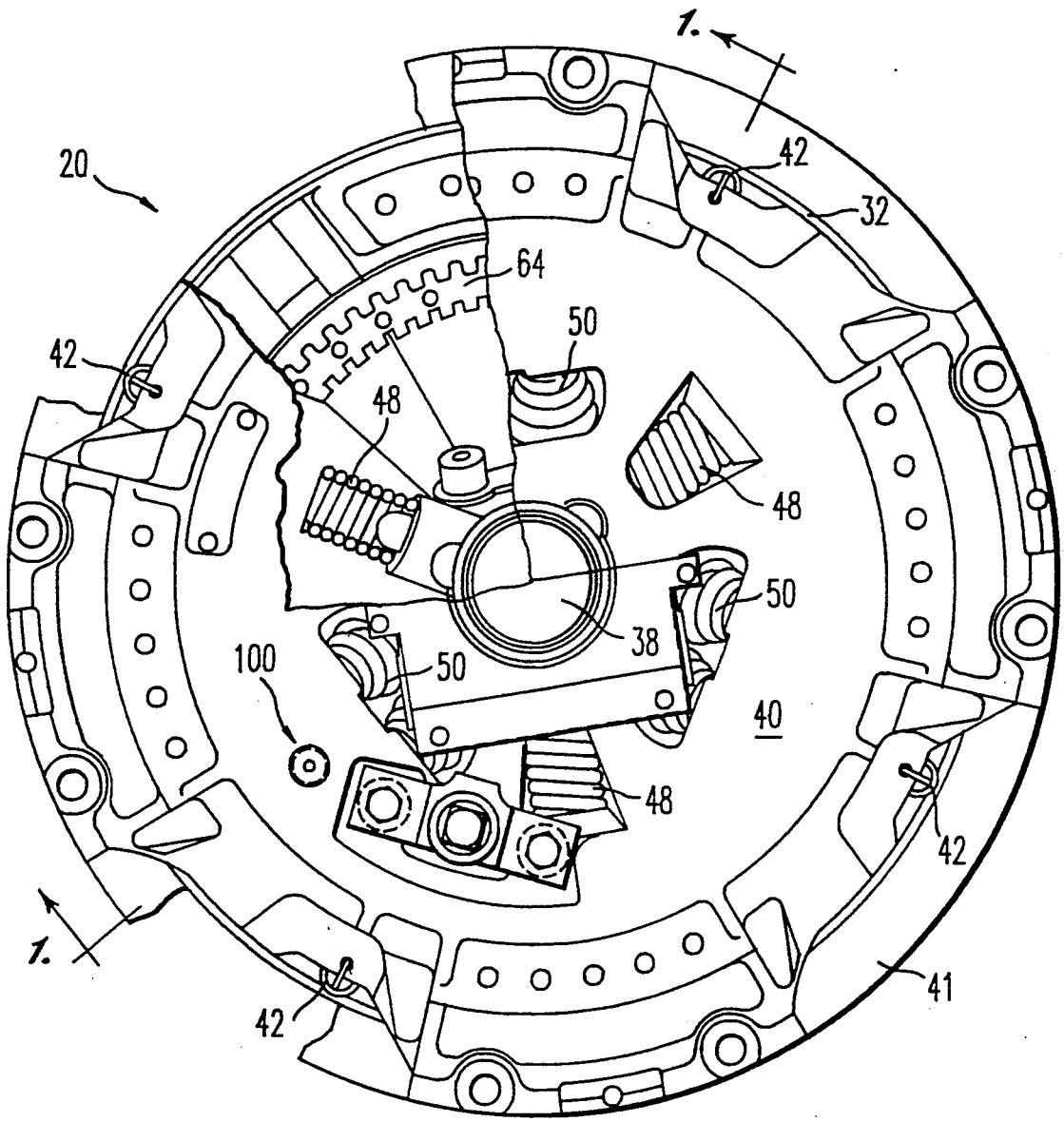
FIG. 2 is a front view of the clutch assembly of FIG. 1.
Figure 5:
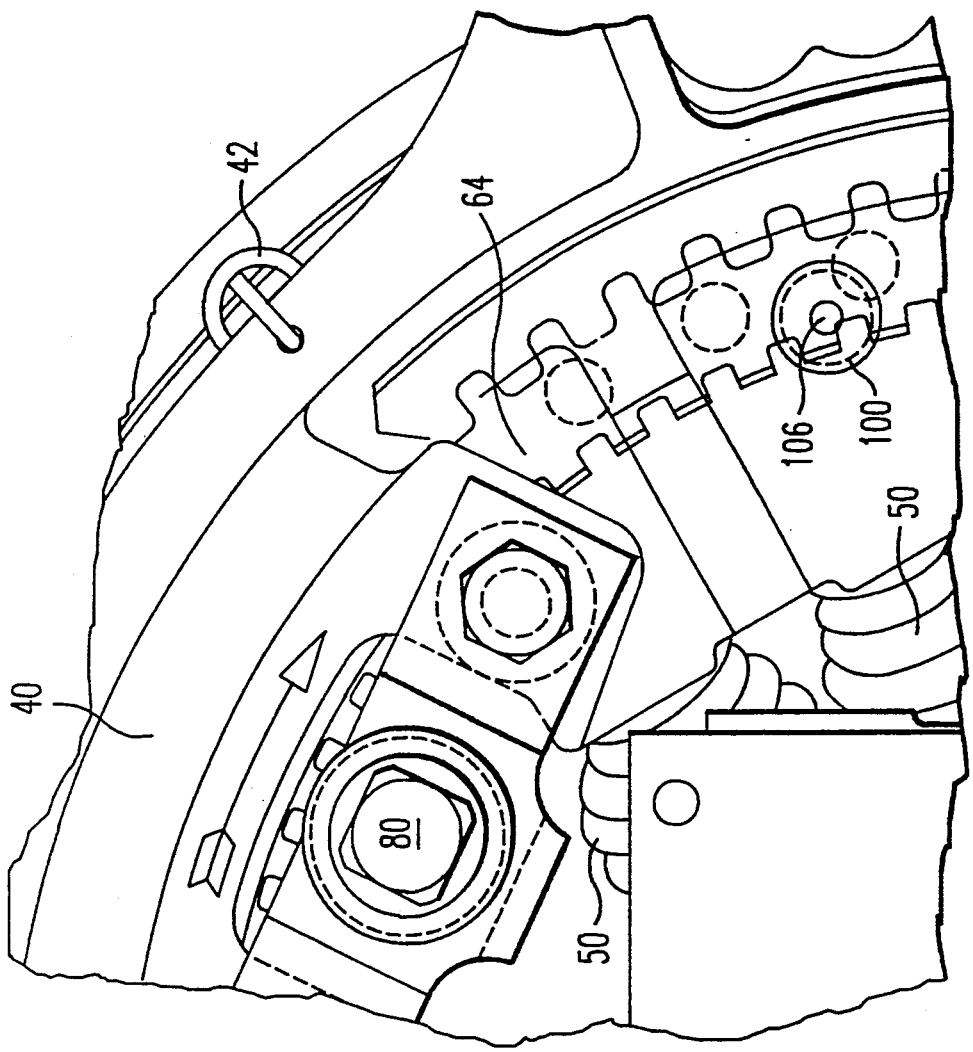
FIG. 5 is an enlarged front view of a portion of the clutch assembly shown in FIG. 1, with portions of the cover deleted.

Referring now primarily to FIGS. 1-3, there is shown a clutch 20, configured in accordance with the principles of the instant invention, wherein first and second driven discs 22 and 24 have friction faces 26 and 28 which are urged into abutment with an intermediate plate 30 by a pressure plate 32 when the clutch is engaged. Driven discs 22 and 24 are fixed via splined hubs 36 and 37 to an output shaft 38, which rotates about an axis 39 and is used to drive, for example, the wheels of a vehicle (not shown). The pressure plate 32 is mounted within a clutch cover 40, which is fixed to a flywheel 41. A plurality of coil springs 42 attach the periphery of the pressure plate 32 to the clutch cover.

The clutch cover 40 is supported on a hub 46 by a plurality of radially extending coil springs 48 and a plurality of canted coil springs 50, which canted coil springs have an axial component urging the hub 46 in the direction of pressure plate 32. A plurality of levers 52, each having a first end 54, a second end 56, and an offset abutting surface 58, are disposed radially around the hub 46. The first end 54 of each lever fits in a pivot groove 58 in the hub 46, while the second 56 of each lever has a slot 60 therein through which extends an L-shaped mounting pivot 62 projecting from an adjusting ring 64.

The adjusting ring 64 is threadably fixed to the clutch cover 40 by a threaded coupling 65 so as to rotate therewith and normally holds the offset abutting surface 58 on the levers 52 in engagement with an opposed abutting surface 66 on the pressure plate 32. Since the springs 50 normally apply an axially directed force component, the hub 46 and the ends 54 of the levers 52 are urged in an axial direction toward the pressure plate 32, urging the abutment surfaces 58 and 66 into engagement so as to press the pressure plate 32 against the assembly of the discs 22 and 24 with the intermediate plate 30. Moreover, the coil springs 48 normally exert a force with a slight axial component in the direction of the axis 41 and are normally disposed over center to direct that component toward the pressure plate 32. In order to disengage the clutch 20, the hub 46 is axially slid against the bias of canted springs 50 to the right in FIG. 1 in the direction of arrow 70. This causes the levers 52 to pivot upon pivots 62 on the adjusting ring 64, thereby disengaging the abutting surfaces 58 and 66 and causing coil springs 48 to move over center to reverse the direction of the axial force component in the direction of arrow 70. This, in turn, causes the pressure plate to move out of abutment with the disc 24, allowing the clutch cover 26 to rotate independently of the output shaft 38 as the cover rotates with the flywheel 41.

Upon releasing the hub 46, the hub is urged by the strong springs 50 in the direction of arrow 72. This causes levers 52 to rotate in the direction of arrow 74 so as to continue to urge the pressure plate 32 against the disc 24 due to engagement of abutting surfaces 58 and 56 to recouple the rotating flywheel 41 to the output shaft 38.

As the clutch 20 operates, the friction faces 26 and 28 on the discs 22 and 24 abrade, changing the distance that the pressure plate 32 must travel in order to maintain frictional engagement between the friction faces. Eventually, the pivotal movement of the levers 52 is no longer sufficient to achieve proper abutment of the friction faces 26 and 27, and the clutch 20 begins to slip. When this happens, the adjusting ring 64 can be axially relocated with respect to the clutch cover 40 by rotating the adjusting ring in the clutch cover. As is seen in FIG. 3, this is accomplished by rotating a pinion gear 80 mounted on the clutch cover 40, which pinion gear has gear teeth 82 that mesh with gear teeth 84 on the inner diameter of adjusting ring 64. As the adjusting ring 64 is rotated, the threaded coupling 65 shifts the adjusting ring in the direction of arrow 72 to shift the pivot 62 for the levers 52 further toward the pressure plate 32.

2. Structure and Operation of the Adjusting Ring Position Indicator (FIGS. 4-8)

The axial position of the adjusting ring 64 is indicative of the position of the pressure plate 32 with respect to the discs 22 and 24. Since the position of the adjusting ring 64 within the clutch housing 40 is not necessarily readily determinable, an adjusting ring position indicator 100 is provided in a bore 101 through outer and inner faces 102 and 105 of the clutch housing so as to be readily visible from outside the housing by a mechanic viewing the clutch 20 wherein the position indicator is made of nylon.

Figure 4:
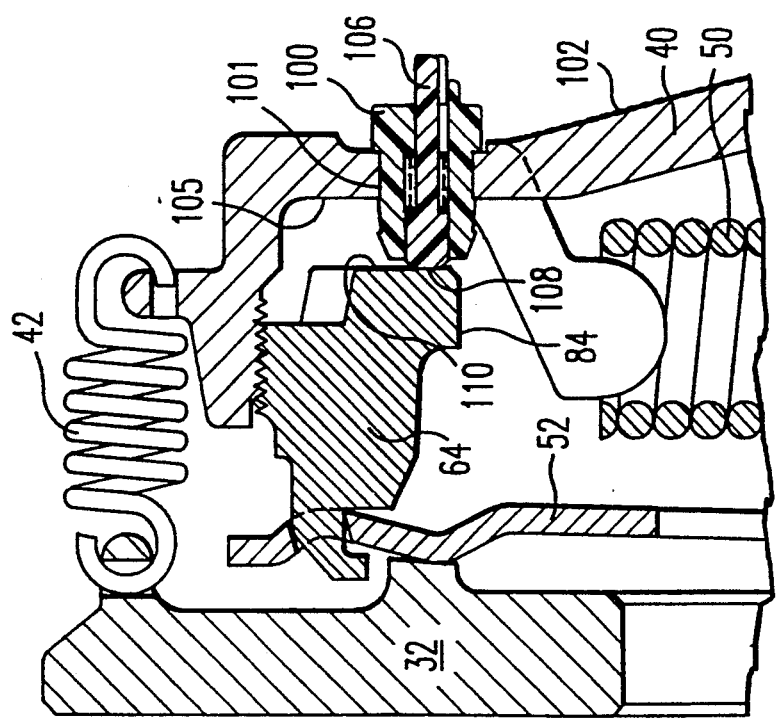
FIG. 4 is an enlarged elevation of a portion of the elevation of FIG. 2.

As is see best in FIGS. 4, 6, 7, and 8, the adjusting ring indicator 100 is comprised of a sleeve 104 which receives a pin 106 having a shank portion 107. As is best seen in FIG. 4, the pin 106 has a first end 108 which bears against a rear face 110 of the adjusting ring 64. The pin 106 is received through the sleeve 104 in a bore 112, which includes an internal shoulder 114 having a radially extending, axially oriented face which opposes a face 116 on the pin 106. Disposed between the faces 114 and 116 is a coil spring 118, which urges the pin 106 in the direction of the arrow 120 so that, as is seen in FIGS. 4 and 1, the end 108 of the pin bears continuously against the face 110 of the adjusting ring 64.

The sleeve 104 has a head portion 124 defined by a shoulder 126, which is of a diameter too large to fit through the bore 101 in the outer face 102 of the clutch cover 40. The shoulder 126 abuts the outer face 102 of the clutch cover 40, while a shoulder 130 abuts the inner face 105 of the clutch cover 40. Since the sleeve 104 has a bore 112 therethrough, the sleeve 104 is able to deform as it is pressed through the bore 101 in the housing and, due to its inherent elasticity, expands once the shoulder 130 clears the inner face 105 of the clutch cover 40. The sleeve 104 also has a tapered end portion 134, which extends from a face 136 having a diameter substantially less than the bore 101 so that the sleeve 104 is easily inserted through the bore. A second shoulder 136 facilitates sliding of the sleeve 104 through the bore 101 by allowing for deformation of the sleeve 104 proximate the front end 138 thereof.

The pin 106 has a rib 140 proximate its second end 142, the rib 140 having a shoulder 144 thereon. When the pin is oriented as in FIGS. 4 and 6, the pin 106 is free to slide in the bore 112 from its solid line position to its dotted line position as the adjusting ring 64 (FIG. 4) is axially moved by rotating the gear 80 meshed with the gear teeth 84 on the adjusting ring 64 (FIG. 3). The sleeve 104 of the indicator 100 has a U-shaped projecting lug 148 having defined therein a slot 150 through which the rib 140 can pass when the pin 106 is oriented as in FIGS. 4, 6, and 8.

For handling purposes, it is desirable that the indicator 100 be assembled as a unit, as is seen in FIG. 6, with the pin 106 inserted in the sleeve 104 against the bias of the coil spring 118 This is accomplished by first sliding the coil spring 118 over the shank portion 107 of the pin 106 and into abutment with the shoulder 116. The second end 142 of the pin 106 is then inserted through a first end 138 of the sleeve 104, compressing the spring 118 between the shoulders 116 and 114. The pin 106 is then rotated so that the shoulder 144 abuts the second end surface 145 of the sleeve 104. This keeps the assembly together so that the assembly can be pressed through the bore 103 in the clutch housing 40 as a unit. Engagement of the end face 108 of the pin 106 with the rear face 110 of the adjusting ring 64 pushes the pin outwardly, and the pin is rotated with the rib 140 aligned in the slot 150, as is seen in FIGS. 4 and 7. Thereafter, as the adjusting ring 64 is axially advanced, the pin 106 will follow the adjusting ring and recede into the sleeve 104 with each axial adjustment of the adjusting ring.

Generally, the pin travels a distance of approximately 0.250" from the solid line position to the dotted line position of FIG. 6. The distance between the shoulders 114 and 116 in the assembly position of FIG. 7 before the indicator is mounted has a distance of approximately 0.257" which, after the indicator is mounted in the clutch housing 40, changes to approximately 0.225" with the spring 118 compressed additionally by about 0.032".

The total travel of 0.250" from the solid to the dotted line position of FIG. 6 results in the second end surface 142 of the pin 146 being flush with the second end surface 145 of the sleeve 104. This provides the mechanic with the indication that the adjusting ring 64 has been adjusted to its fullest extent and that the clutch 20 must, therefore, be removed from the vehicle and either replaced with an unworn clutch or, if feasible, repaired and reinstalled.

Preferably, the pin 106 and the sleeve 104 are made of a self-lubricating material such as nylon.

From the foregoing description, one skilled in the art can easily ascertain the essential characteristics of this invention and, without departing from the spirit and scope thereof, can make various changes and modifications of the invention to adapt it to various usages and conditions.

I claim:

1. A device for indicating the position of one component with respect to another, comprising:
    a sleeve having a bore therethrough with an axially facing shoulder therein, the sleeve having first and second ends with positioning abutments thereon;
    a pin receivable in the bore, the pin having a first end for bearing against one of the components and a second end which is visible, the pin having a shoulder thereon facing the shoulder in the bore;
    a coil spring disposed between the shoulder on the pin and the shoulder in the bore to urge the pin to project from the first end of the sleeve; and
    means for releasably holding the pin in the sleeve against the bias of the coil spring until the device has been mounted on one of the components with the pin abutting the other component wherein the means for releasably holding the pin retracted comprises an abutment proximate the second end of the pin which engages a surface on the sleeve when oriented in one direction and clears any surface on the sleeve when oriented in another direction.

2. The device of claim 1, wherein the means for releasably holding the pin retracted comprises an abutment proximate the second end of the pin which engages a surface on the sleeve when positioned in one angular orientation and clears any surface on the sleeve when positioned in another angular orientation.

3. The device of claim 2, further including an ax extending groove in the sleeve and an axially extending rib on the pin, which rib is selectively receivable in the groove and wherein the abutment on the rib is a first radially extending surface and the abutment surface on the sleeve is a second radially extending surface whereby, when the rib is rotated out of alignment with the groove, the pin is held within the sleeve by the abutting surfaces and, when the rib is in alignment with the groove, the pin slides relative to the sleeve.

4. In combination with a clutch having a clutch housing with internal threads in which is threadably mounted an adjusting ring which adjusting ring advances axially to accommodate for wear in the clutch and which adjusting ring has a rear surface facing an inner surface of the clutch housing, an adjusting ring position indicator comprising:
    a sleeve inserted through the clutch housing in alignment with the rear surface of the adjusting ring, the sleeve having a bore therethrough and including means thereon for retaining the sleeve in the clutch housing;
    a pin slidably received within the sleeve, the pin having a first end for abutment with the rear surface of the adjusting ring and a second exposed end visible from outside of the clutch housing, whereby when the first end of the pin is in engagement with the rear surface of the adjusting ring, the exposed end of the pin provides a visual indication of the position of the adjusting ring with respect to the clutch housing and thus of wear undergone by the clutch means for releasably holding the pin retracted comprising an abutment proximate the second end of the pin which engages a surface on the sleeve when oriented in one direction and clears any surface on the sleeve when oriented in another direction.

5. The combination of claim 4, wherein the adjusting ring position indicator further includes means having a bias for continuously urging the pin into contact with the adjusting ring.

6. The combination of claim 5, wherein the adjusting ring position indicator further includes means for retaining the pin assembled within the sleeve against the bias of the means for urging the pin into contact with the adjusting ring.

7. The combination of claim 6, wherein the means for retaining the pin assembled with the sleeve comprises abutting surfaces on the sleeve and pin.

8. The combination of claim 7, wherein the sleeve includes an axially extending slot having a portion projecting from the sleeve and wherein the pin includes an axially extending rib having one of the abutting surfaces thereon, the rib being selectively alignable with the axially extending slot when placed in an operative mode.

9. The combination of claim 8, wherein the bore within the sleeve includes an inwardly extending radial shoulder, the pin includes a radial shoulder positioned in opposition to the radial shoulder of the sleeve, and wherein the urging means comprises a coil spring disposed between the shoulders.

10. The combination of claim 9, wherein the sleeve includes a pair of exterior shoulders for abutting opposite faces of the clutch housing so as to retain the indicator within the sleeve.

11. The combination of claim 8, wherein the indicator is made of nylon.

* * * * *